April 7, 1959     A. E. CARLSON     2,880,781
APPARATUS FOR THE PRODUCTION OF REINFORCED SHEET MATERIALS
Original Filed March 3, 1953     5 Sheets-Sheet 1

INVENTOR.
ARTHUR E. CARLSON
BY Toulmin & Toulmin
ATTORNEYS

April 7, 1959   A. E. CARLSON   2,880,781
APPARATUS FOR THE PRODUCTION OF REINFORCED SHEET MATERIALS
Original Filed March 3, 1953   5 Sheets-Sheet 2

INVENTOR.
ARTHUR E. CARLSON
BY Toulmin & Toulmin
ATTORNEYS

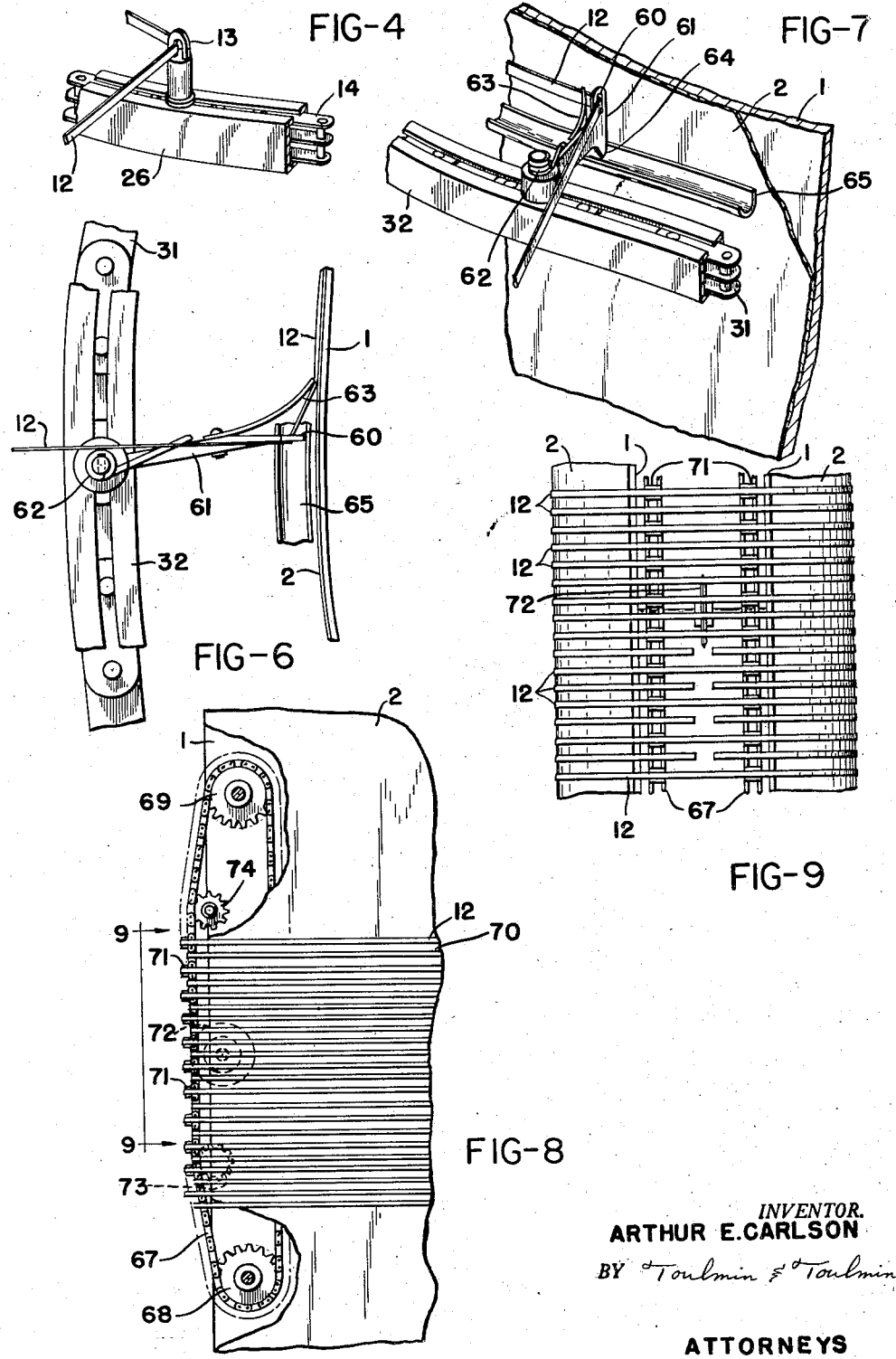

April 7, 1959     A. E. CARLSON     2,880,781
APPARATUS FOR THE PRODUCTION OF REINFORCED SHEET MATERIALS
Original Filed March 3, 1953     5 Sheets-Sheet 5
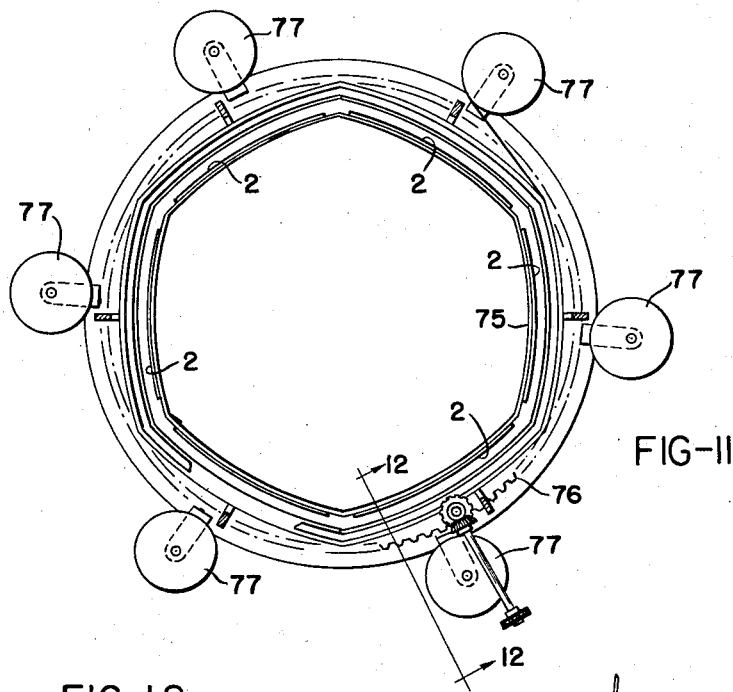
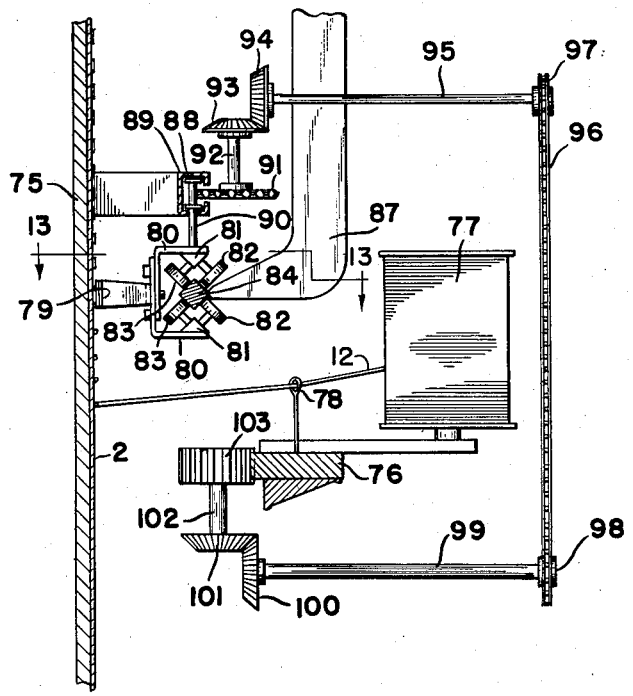
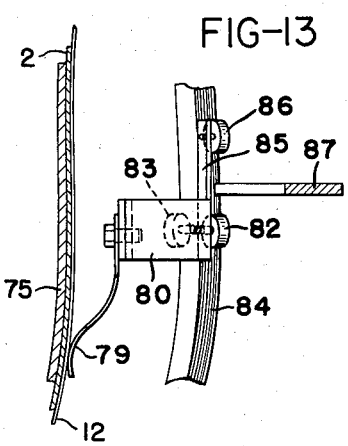
INVENTOR.
ARTHUR E. CARLSON
BY Toulmin & Toulmin
ATTORNEYS

United States Patent Office 2,880,781
Patented Apr. 7, 1959

2,880,781

APPARATUS FOR THE PRODUCTION OF REINFORCED SHEET MATERIALS

Arthur Evald Carlson, Troy, Ohio

Original application March 3, 1953, Serial No. 340,029, now Patent No. 2,780,572, dated February 5, 1957. Divided and this application October 14, 1955, Serial No. 540,492

13 Claims. (Cl. 154—1.7)

This invention relates to apparatus for the production of tranversely reinforced backings such as sheet material.

This application is a division of my co-pending application Serial No. 340,029, filed March 3, 1953, now Patent No. 2,780,572.

This invention has as a primary object the provision of apparatus for applying reinforcing elements to a backing such as kraft paper, the apparatus being arranged to apply the elements transversely to the length of the paper in a continuous fashion.

A particular object of the invention is the provision of apparatus for the manufacture of reinforced paper backings such as stay tapes.

The apparatus provides for the spreading of bundles of textile reinforcing elements consisting of many substantially untwisted members, the elements being applied transversely to the paper or other sheet material and pressured by the apparatus to form a wide thin band. Thus intimate contact is provided between reinforcing elements and the sheet material and the thickness of the reinforcing elements is very small compared to the width of the band of elements.

Means are provided in the apparatus for spreading the reinforcing elements, and such include one or more pressure instruments which are utilized to flatten the bundles of reinforcing elements before adhesive material securing the elements to the backing has set or hardened. Suitably the pressure instruments consist of a blade-like member or roller, spring urged against the reinforcing elements, and preferably the pressure instruments are covered or coated with a material to which adhesive will not adhere; such covering material is, for example, "Teflon."

The apparatus includes appropriate means for the application of adhesive to the reinforcing elements during the operation of combininng the elements with the backing; the adhesive is conveniently applied to the reinforcing elements between the source of supply of the reinforcing elements and a work station where the elements are applied to the backing. The application of the adhesive is effected through the medium of a spray, by immersion, or rollers, for example.

A further object of this invention is to provide apparatus for reinforcing a plurality of sheets of backing material in a transverse direction, in which apparatus sheets of material are so arranged, while the reinforcing elements are being applied to the backing, that the several sheets form a polygon.

Yet another object of this invention is to provide a device for reinforcing sheet material with bundles of small diameter yarns, in which device the yarns of a bundle are fed from one or more bobbins or sources of supply through a common guide mechanism to a position where the yarns are applied to the sheet material, the yarns being subsequently spread out over the sheet material to form a band having a thickness substantially equal to the diameter of the individual yarns.

The invention will be more fully understood by reference to the following detailed description and accompanying drawings wherein:

Figure 4 is a fragmentary perspective view showing parts in section and taken substantially on line 4—4 of Figure 2;

Figure 6 is a fragmentary view taken substantially on line 6—6 of Figure 5;

Figure 7 is a perspective view of the structure of Figure 6;

Figure 8 is a fragmentary side elevational view of the mandrel of Figure 1 and mechanism associated therewith;

Figure 9 is a fragmentary end elevational view substantially in the direction of the arrows 9—9 of Figure 8;

Figure 11 is a top plan view of a further modification of the structure of invention;

Figure 12 is a fragmentary view taken substantially on line 12—12 of Figure 11;

Figure 13 is a fragmentary cross sectional view taken substantially on line 13—13 of Figure 12;

Figure 16:
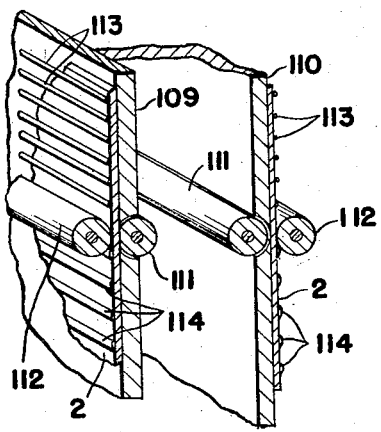
Figure 17:
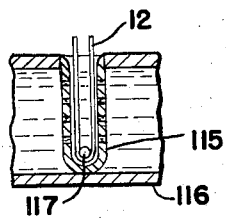
Figure 18:
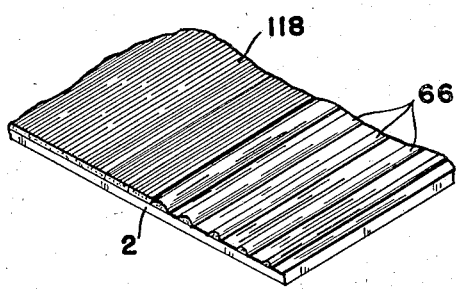

Figure 16 discloses a modified mandrel and pressure roller mechanism for spreading yarns before adhesive thereon is dry;

Figure 17 is a fragmentary cross sectional view of a portion of an adhesive pot or tank; and Figure 18 illustrates one form of reinforced product produced with the apparatus of invention.

Figures 1, 10, 14:
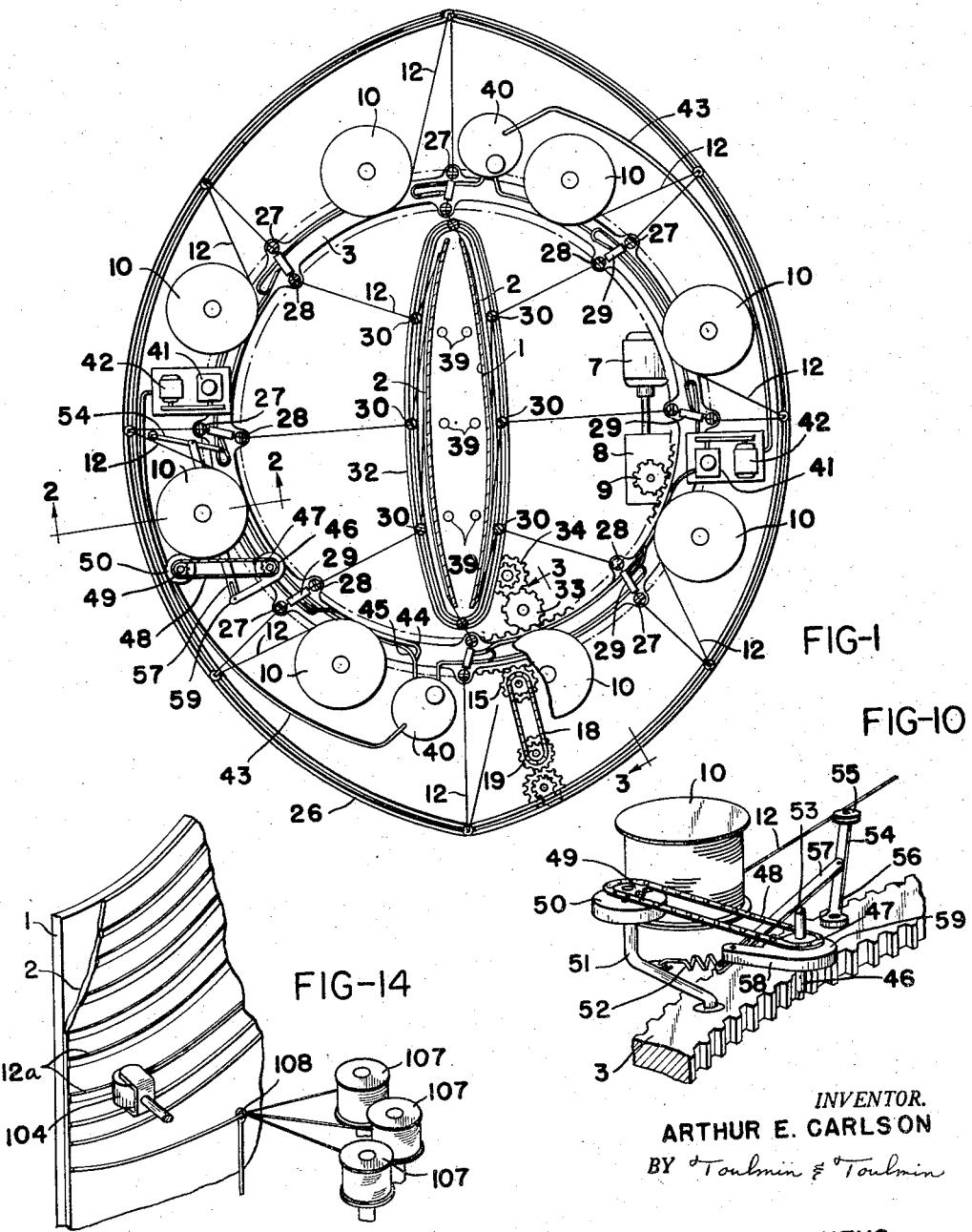
Figure 1 is a top plan view of a preferred embodiment of the apparatus of invention, with parts broken away.
Figure 10 is a fragmentary view in perspective illustrating control apparatus for the feeding of the bundles of filaments from a source of supply to the mandrel.
Figure 14 is a fragmentary view of a modification utilizing a plurality of sources of supply, a common guiding means for grouping the bundles of yarns together, applying them to a sheet, and spreading the bundle into a wide band.
Figure 2:
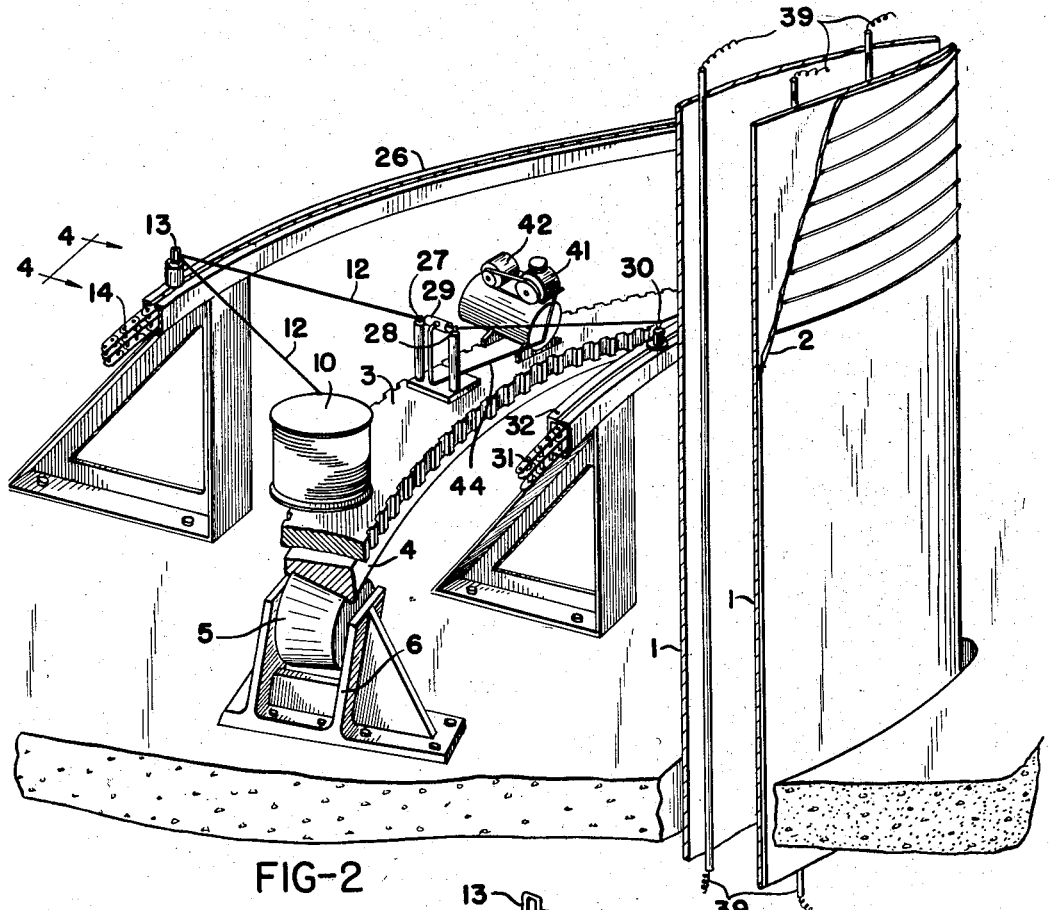
Figure 2 is a fragmentary view in perspective with parts in section, the view taken substantially on line 2—2 of Figure 1.
Figure 3:
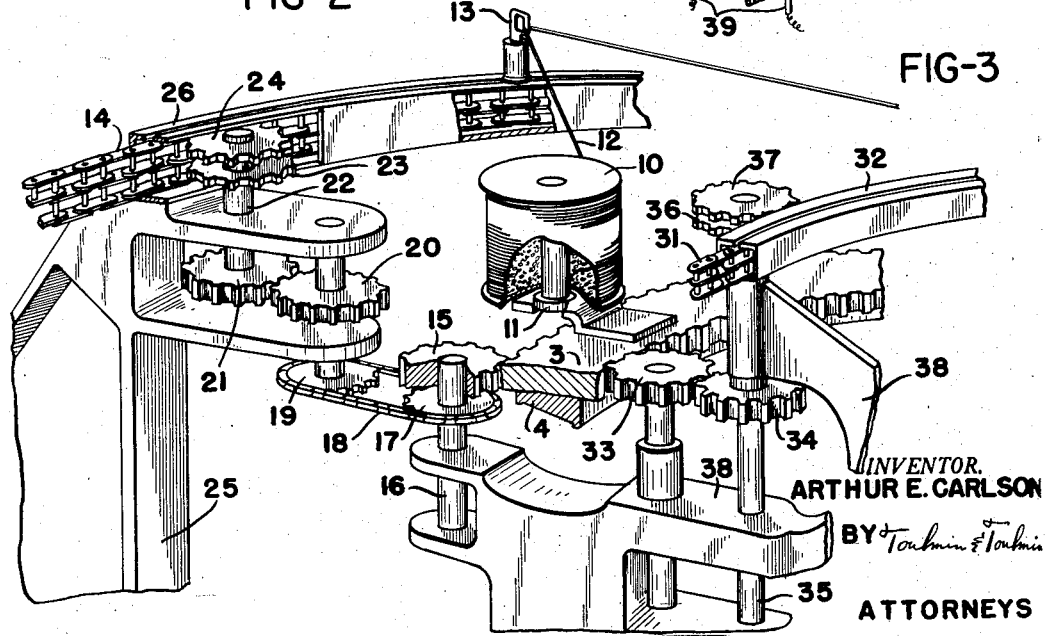
Figure 3 is another fragmentary view taken substantially on line 3—3 of Figure 1.

Referring now to the drawings and initially particularly to Figures 1-3, inclusive, the numeral 1 designates a mandrel which is substantially oval or elliptical in shape. The mandrel is suitably in two halves and the longitudinal axes of the halves extend parallel to each other, although they may extend obliquely to each other, as disclosed in my co-pending application Serial No. 178,434, filed August 9, 1950, now Patent No. 2,718,254 granted September 20, 1955.

Backings or base sheets 2 are fed downwardly or upwardly, as the case may be, over the mandrel, there being one base sheet on each side. For the purpose of this description the base sheets are to be considered as fed downwardly over the sides of the mandrel. This mandrel is supported in any suitable manner.

If desired the mandrel may be provided with heater elements for heating the surface thereof to accelerate the drying or the curing of adhesive material used in manufacturing the reinforced sheet assembly, and in the event a thermoplastic or thermosetting adhesive is used, the heated mandrel may then be utilized to soften the plastic molding material to cause the reinforcing strips to adhere to the surface of the base sheet of paper, as will appear more fully hereinafter.

A gear ring 3, provided with both internal and external gear teeth, surrounds the mandrel 1. This gear ring 3 is provided with an annular support 4 (Figure 3) fixedly attached thereto and mounted for rotation upon a plurality of rollers 5, which are frustum-conical in shape and supported for rotation in brackets 6 mounted upon a suitable base or upon the floor supporting the apparatus, as indicated in Figure 2. This arrangement permits the gear ring 3 to be rotated around the mandrel 1 and the sheets 2. The gear ring 3 is driven by a suitable electric motor 7 through gear reducing unit 8 driving a pinion 9 meshing with the internal teeth of the gear ring 3. Whether the pinion 9 meshes with the internal teeth or the external teeth is optional.

Gear ring 3 supports a plurality of spools, tubes or rolls 10 of reinforcing material. As best seen in Figure 3 each spool 10 is mounted upon roller bearings as indicated at 11. The reinforcing elements in the form of strips or tapes 12 are fed from the spools 10 through a peripherally disposed substantially D-shaped guide member 13 mounted upon a double chain 14. Double chain 14 is driven from the ring gear 3 through a spur gear 15 keyed to shaft 16, which shaft also has keyed thereto a sprocket wheel 17 driving chain 18. Chain 18 is in driving relation with sprocket 19 and also with spur gears 20 and 21, the latter of which is mounted on shaft 22. Sprocket wheels 23, 24 also carried on shaft 22 are accordingly motivated by chain 18. Spur gears 20 and 21 are journaled in a bracket or standard 25. It can readily be seen that as the gear ring 3 rotates the chain 14 is driven and rotated in the same direction and at the same revolutions per minute as the gear ring. Double chain 14 is mounted in a guide track 26 consisting of a channel which is elliptical in shape, as best seen in Figure 1.

Reinforcing strip 12 passes from guide member 13 inwardly through a guide 27 mounted on the gear ring 3, as best shown in Figures 1 and 2, and through a second guide 28 also mounted upon the gear ring 3.

A spray booth 29 is mounted between the guides 27 and 28 and supported upon the gear ring 3. This spray booth rotates with the gear ring 3, as do the guides 27 and 28. The reinforcing strip 12 is then fed towards the mandrel and passes through guide 30 supported on double chain 31. Double chain 31 is mounted in channel guide 32 having a contour similar to the contour of the mandrel, as indicated in Figure 1. Channel guide 32 is mounted in close proximity to the mandrel and guide 30 travels in a path near the base sheets. Each of the strips 12 passes through guide 30 near the base sheets; thus the distance between the guide 30 and the point of tangency where strips 12 touch the sheet's surface remains constant. Therefore the strips are withdrawn from their sources of supply at a substantially constant rate, except as they are affected by the non-circular shape of the mandrel, while the spools rotate in a circular path. Further means for obtaining a constant rate of removal of strip 12 from the spools 10 will be more fully described hereinafter.

The chains 31 are driven from the gear ring 3 through spur gear 33 which meshes with gear 34 keyed to shaft 35; shaft 35 has fixedly secured thereto a pair of sprocket wheels 36 and 37, as seen in Figure 3, for effecting driving of chain 31. Gears 33 and 34 and shaft 35 are mounted in a standard or bracket 38, which also supports the gear 15 above described and as clearly shown in Figure 3. As the gear ring 3 rotates the chains 14 and 31 are drive in synchronism therewith.

The gear ratios between the gear ring 3 and the chains 14 and 31 are such that the chains 14 and 31 complete one revolution when the gear ring 3 makes one revolution. The strips 12 are wrapped upon the paper 2 fed downwardly over the mandrel 1. The path of the chain 31 guided through the channel guide 32 is determined by the shape of the mandrel. It is necessary in a high speed operation that the reinforcing strips 12 be withdrawn from the spool 10 at a substantially uniform rate of speed in order that the rotation of the heavy supply package 10 of strip material will be smooth and free of starts and stops, and thus substantially uniform tension will be maintained on strips 12 and the same will not be broken.

Due to the fact that the spools 10 travel through a circular path and that the application of the reinforcing strips to the paper takes place along an oval or substantially elliptical path it is necessary to cause the reinforcing elements to travel through a suitable path to compensate for the difference in shape of the circular path of the spools and the outside contour of the mandrel.

The outer oval track 26 has been so designed that the distance of any one reinforcing element during any one revolution from its spool 10 to the guide member 13, plus the distance from the guide 13 to the guide 27, plus the distance to the guide 28, plus the distance to the guide 30, and plus the distance from guide 30 to the point of tangential contact of the strips with the base sheet, is substantially constant throughout the revolution of the ring.

In the event the reinforcing strips 12 are coated with a heat responsive material, the guides 27 and 28, the spray booth 29 and the guides 30, together with the inner chain and its associated parts, may be eliminated. Under this condition the guide track 26 for the chain 14 is so designed that the distance from the supply package or roll 10 to the guide 13, plus the distance from the guide 13 to the point of contact of the backing sheet 2, is constant throughout the winding operation.

The reinforcing strips 12 are adhesively secured to the sheet material or backing sheets 2 and the adhesive may be confined to the areas between the reinforcing strips 12 and the backing sheets 2. This is suitably accomplished by pre-coating the strips 10 with a heat sensitive adhesive. One example of a desirable type of adhesive is the so-called instantaneous grab-type. In such a case the mandrel is suitably heated by electrical elements 39 as shown in Figure 1 and upon contact of strips 12 with the backing sheets and spreading of the filaments as described hereinafter a firm adhesive bond is assured.

In the event a solvent is to be applied, such as water or a chemical such as isopropanol, it is applied when the strips 12 pass through the spray booth 29, or through a U-shaped passage as described hereinafter in connection with Figure 17.

Referring to Figure 1 the solvent is found in a pair of containers or reservoirs 40 diametrically mounted upon the ring gear 3, in order to reduce vibration. For the purpose of supplying air pressure, a pair of compressors 41, also diametrically mounted on the ring gear 3 and driven by electric motor 42, are used to force the solvent in the form of a spray against one side of the strips 12. The compressors 41 are connected by means of conduits 43, one to one reservoir 40 and the other conduit to the other reservoir 40. The solvent is supplied to the spray booths by means of suitable conduits 44 and the air pressure is supplied to the spray gun, if a spray gun is used, through conduits 45.

In the event the strips have not been pre-coated with an adhesive material, the adhesive is applied in the form of a spray in the spray booth. The strips 12 are then fed to the base sheets through their respective guides.

In the device of Figure 1, eight spools, eight strips of reinforcing material, eight sets of guides and eight spray booths have been set out for purpose of illustration. The number of spools employed is a matter of choice; likewise the size of the spools depends upon the particular arrangement, and the larger spools contribute to a longer cycle of operation. When large and heavy spools are used it is necessary to provide a power drive for each of the spools. Such a power drive is shown in Figure 1.

The power drive of Figure 1 includes a driven shaft 46, driven at a rate of speed commensurate with the velocity of the gear ring 3. This shaft drives a sprocket wheel 47 over which a drive chain 48 (Figure 10) passes to drive a sprocket 49 connected to a friction wheel 50 journaled in the end of an arm 51, pivoted on ring gear 3 and urged by spring 52 towards the surface of the reinforcing material on spool 10. By this described arrangement it is possible to maintain a constant peripheral speed of the reinforcing material on the spool, which speed should be substantially the same feet per minute as the feet per minute of reinforcing strips 12 that are wrapped around the mandrel 1.

A tensioning device for tensioning the reinforcing strips 12 and for absorbing the slack therein includes (Figure 10) shaft 53 and an arm 54 which is pivotally mounted upon the gear ring 3. Arm 54 rotatably supports at its outer end a roller 55. Spring 52 biases the arm 54 to cause the roller 55 to tension the strip 12, there being one tensioning device for each of the strips 12.

A link mechanism, including link 57, pivotally interconnects arm 54 and arm 58 through a lost motion mechanism. Arm 58 releases a clutch 59 used in connecting the sprocket wheel 47 to the drive shaft 46. By this arrangement it can readily be seen that when slack of predetermined magnitude accumulates in the strips 12, which slack is absorbed by the roller 55 mounted upon the arm 54, the link 57 releases clutch 59 in order to disconnect the friction wheel 50 from the driving mechanism. The only force supplied then to the spool or roll 10 is the pull of the strips 12. When the slack is absorbed the clutch 59 will again be engaged, causing the friction wheel 50 to again drive the rolls 10 until a slack again develops sufficient to release the clutch.

Figure 5:
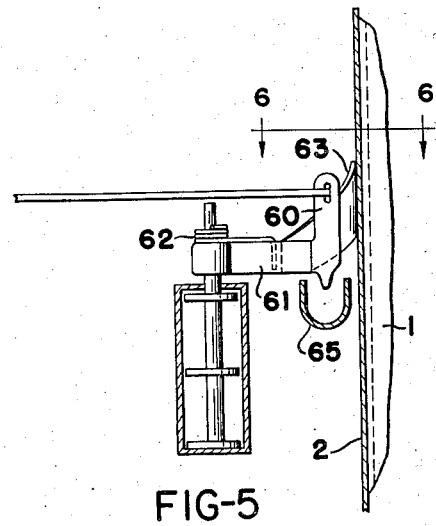
Figure 5 is another fragmentary view with parts in section illustrating an arrangement of a pressure instrument in cooperation with the reinforcing elements in the application of the elements to a backing.

When the reinforcing strips or elements 12 are applied there is a tendency for the reinforcing elements to gather into a circular contour. This being the case it is quite desirable to flatten the textile elements into a ribbon-like or band formation immediately before or immediately after they are applied to the paper 2 on the mandrel. In order to flatten the elements before they are applied to the paper the device of Figures 5–7, inclusive, has been provided.

Hereinafter there is described apparatus for spreading the reinforcing elements out immediately after they contact the paper. In the modification shown in Figures 5–7, inclusive, instead of utilizing the guide 30 a guide 60 is used. Guide 60 is mounted on arm 61 pivotally attached to chain 31 in the channel-shaped track or guide 32. Arm 61 is biased in a clockwise direction, as shown in Figure 6, towards the mandrel 1 by a torsion spring 62. A wiper blade or reinforcing strip applicator 63 is suitably attached to arm 61 in order to press the reinforcing element 12 against the backing sheet 2 mounted on the mandrel 1. This definitely fixes the distance between the guide 60 and the mandrel 1.

Further, the blade or applicator 63 presses the reinforcing elements against the paper to make the elements thin and wide to insure a good firm bond between the reinforcing strips and the sheet material. Spring 62 applies a constant pressure to the applicator 63 and the bundles of filaments arranged in untwisted relation for lateral displacement under the application of the force spread laterally into a thin band. In the guiding of the filaments to the spread condition some few filaments may overlie others of the filaments and the product is characterized by a plurality of levels of the filaments over at least some portion of the width of the reinforcement. The reinforcement however is of such a thinness overall that these slight variations are not in any way detrimental to the product appearance.

Guide 60 is provided with a downwardly projecting spout 64 (Figure 7) located above the trough 65 and any excess adhesive material on the reinforcing elements is fed into the trough where it may be reclaimed. Where textile elements are used in the form of a ribbon-like band as herein described, the guide 60 has been designed so that the cross-sectional area of the opening in the guide is substantially equal to the total cross-sectional area of the reinforcing elements. Thus even though the reinforcing elements tend to be drawn together in a compact mass after leaving the spray booth, due to the surface tension of the adhesive material, and possibly other factors, the reinforcing elements are spread out into a ribbon-like formation by the contour or shape of the orifice or opening in the guide 60. This orifice has the form of a slot that is long and narrow (Figure 7), thereby producing a ribbon-like band applied to the paper backing sheet. Furthermore the applicator or blade 63 will exert a pressure against the surface of the filaments or ribbon-like band, causing the reinforcing elements to present a smooth outer surface 66, as clearly shown in Figure 18.

If reinforcing elements are used that tend to contract when the adhesive sets or cures, the reinforcing elements will cause a binding action on the mandrel. This has been overcome in the modification shown in Figures 8 and 9. In this latter arrangement a pair of chains or flexible bands 67 are mounted in the margin between the two halves of the mandrel 1. These chains or bands pass over sprocket wheels or spur gears 68 and 69 driven by a suitable mechanism not disclosed. The rate of speed or the velocity of the flexible bands 67 is synchronized with the rate at which the reinforcing elements are applied.

In the event that both paper reinforcing strips 70 and textile reinforcing elements 12 are used alternately on supply spools the paper strips will not contract as much as some types of textile elements, as for example, continuous length rayon filaments. In this case every other link of the chain 67 is then provided with a bridge-like extension or projection 71. If the textile filaments are made from a material that causes them to contract as the adhesive material is being cured, the textile bands 12 will then be passed over the bridge-like projections 71 found on every other link of the chain. This provides a slack in the textile ribbon-like bands and permits the contraction thereof without providing a like slack in the paper reinforcing elements 70. In order to remove any binding action on the part of the reinforcing paper strips 70, these paper strips may be severed by a rotary cutter 72 mounted between the chains or flexible bands 67 and driven in any suitable manner to cut the paper reinforcing elements without severing the textile reinforcing ribbon-like bands 12.

The flexible band or chain 67 in addition to passing over the sprockets 68 also passes over a pair of idlers 73 and 74, which causes the flexible band or chain 67 to travel in a path projecting beyond the margins of the mandrel 1. The idlers 73 and 74 have been provided to furnish sufficient slack in the reinforcing strips or bands. Thus the apparatus provides for the simultaneous handling of reinforcing elements which contract and elements which do not contract.

The use of the flexible chain or band 67 in addition to providing slack in the reinforcing elements, also prevents the reinforcing elements from binding along the margins of the mandrel. The flexible members 67 traveling in synchronism with the rate of speed at which the reinforcing elements are applied, eliminate the binding of the reinforcing elements along the margins of the mandrel, thereby expediting the feeding of the sheet material over the mandrel with the greatest of ease.

The distance that the flexible band or chain 67 moves outwardly from the margin of the mandrel has been greatly exaggerated in Figure 8 for the purpose of illustration. The idlers 73 and 74 are preferably adjustably mounted to permit adjustment towards and away from the margins of the mandrel as may be required.

Likewise, the distance between the two chains or flexible members 67 has been exaggerated in Figure 9 for the purpose of clearness. These chains are located in close parallel paths in actual operation. The only clearance required between the two chains or flexible bands 67 is sufficient space for the operation of the rotary disc cutter 72. Although only one pair of chains or flexible bands has been shown, both margins of the mandrel are each provided with one or more chains or flexible bands.

In some of the figures disclosing the apparatus, such as Figures 8 and 9, the reinforcing elements 12 and 70 have been shown as comparatively narrow bands with spaces between them, which has been done for the purpose of illustration. In actual practice the reinforcing elements 12 and 70 are of such a width as to practically cover the entire sheet of paper when both types are used.

In the preferred embodiment of the apparatus already described, a two-sided mandrel has been shown wherein two sheets are reinforced simultaneously. In order to increase production and in some respects simplify the apparatus, the mandrel may consist of a plurality of sides for feeding a plurality of sheets, as clearly shown in the modification set out in Figures 11–13, inclusive. In this modification, a six-sided mandrel 75 has been shown for feeding six sheets 2. Surrounding the mandrel is a ring gear 76 similar to gear 3 disclosed in the preferred embodiment and supported in a similar manner. This ring gear 76 supports a plurality of supply packages or bobbins 77 of reinforcing material. Although the sides of the polygon formed by the mandrel in Figure 11 are shown to be arcuate, the mandrels may be flat.

Due to the fact that the adjacent sides of the mandrel form an obtuse angle approaching 180° it may be necessary to compensate for variations in the rate at which the reinforcing elements are withdrawn from the bobbins 77. In the event the number of sides is increased sufficiently to provide a substantially circular mandrel, the reinforcing material is withdrawn at a uniform speed during normal operating conditions.

The reinforcing elements may be fed through a suitable eye 78 (Figure 12) supported on ring gear 76 and, if necessary, through a spray booth as disclosed in connection with the preferred embodiment, or through a glue pot, as disclosed in my application Serial No. 178,434, filed August 9, 1950, (now Patent No. 2,718,254) or the glue pot disclosed in application Serial No. 179,302, filed August 14, 1950, (now Patent No. 2,,699,813) in order to apply adhesive to the reinforcing elements. Instead of a single adhesive trough as disclosed in the applications referred to above, a number of adhesive pots could be used so long as they rotate with the yarn supply packages. This is shown in Figure 17 in one type of structure. In the event the reinforcing elements already contain adhesive material that is pressure responsive, or that may be activated, it is not necessary to feed the reinforcing elements through a source of supply of adhesive material.

In order to spread the reinforcing elements immediately after they are applied to the paper, an instrument is provided which may include a spreader blade 79, shown in Figures 12 and 13, and supported upon a pair of angle brackets 80 forming a framework for the carriage 81 supporting rollers 82 and 83 riding upon a stationary track 84 that may be substantially square in cross-sectional area. This track may be shaped to extend substantially parallel to the sides of the mandrel 75.

A unfiorm pressure is applied to the reinforcing elements throughout the entire periphery of the mandrel. Due to the fact that the blade 79 exerts a pressure against the reinforcing elements, it can be readily seen that there would be a tendency for the carriage to rotate in a counterclockwise direction, as shown in Figure 13, about the rollers 82 and 83 in order to cause the pressure instrument to move out of contact with the reinforcing elements. To offset this torque an arm or pair of arms 85, each supporting a roller 86, contact the surfaces of the track 84 that are farthest removed from the mandrel, in order to firmly hold the spreader instrument against the reinforcing elements throughout the entire periphery.

The track 84 is supported upon a plurality of mounting brackets 87. Mounting brackets 87 are supported upon a stationary support (not shown) located a considerable distance above the ring gear 76 or below the ring gear, depending upon the relative position of the track 84 with respect to the ring gear.

In order to cause the carriages 81 to travel around the mandrel, a drive mechanism for the carriages has been shown, which drive mechanism includes a chain 88 guided through a guide track or rail 89. The upper bracket 80 of each of the carriages 81 is secured to the chain 88 by a suitable shaft-like member 90. Chain 88 is driven through sprocket wheel 91 which is keyed to the shaft 92; shaft 92 is driven by bevel gear 93 meshing with a pinion 94 keyed to the shaft 95. Shaft 95 is actuated by chain 96 passing over sprocket wheel 97 and over sprocket wheel 98 keyed to the shaft 99. Shaft 99 is driven through pinion 100 which meshes with bevel gear 101 keyed on a suitable shaft 102. Shaft 102 is actuated through gear 103 which meshes with the internal gear teeth of the ring gear 76. Shafts 95, 99 and 102 are mounted in suitable bearings (not shown). A second chain drive may be placed below the carriages and secured thereto in like fashion, to remove the possibilities of the carriage wheels binding on the track.

It can readily be seen that as the ring gear 76 rotates and is driven by the drive mechanism described in connection with the preferred embodiment, the chain 88 will be driven and the carriages connected with the chain 88 will be driven therewith. The relative speed of the chain 88 with respect to the ring gear 76 depends upon the gear ratio of the driving mechanism. The chain 88 may be driven at the same speed and in the same direction as the ring gear 76. The spreader blade 79 may spread some of the adhesive in the reinforcing elements laterally in order to coat the adjacent areas of the backing sheet 2. By applying the proper amount of adhesive it is possible to completely cover the areas between the reinforcing elements with the adhesive supplied by the reinforcing elements. Thus a coating process and a reinforcing process are combined into a common process.

Figure 15:
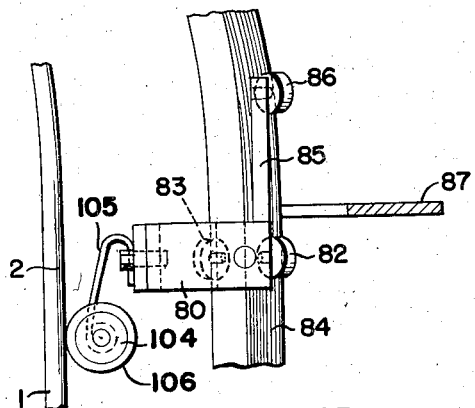
Figure 15 is another fragmentary cross sectional view disclosing roller means for flattening the reinforcing elements on the backing.

Instead of using a spreader blade as disclosed in Figure 13, a pressure roller 104, as shown in Figure 15, mounted upon a resilient support 105 may be used. This pressure roller 104 is preferably covered by suitable material, as for example, a plastic 106, sold in the trade under the trademark "Teflon," that has almost no affinity for certain types of adhesive material, as for example, adhesive materials having a latex base.

The spreader blade 79 may also be protected by a coating of "Teflon" or some other suitable material that does not have affinity for the adhesive material.

The support member 105 is mounted upon a carriage substantially identical to the carriage 81 described in connection with Figure 13.

The device disclosed in the modification shown in Figures 11–13, inclusive, may reinforce a number of sheets of material for each revolution of the supply packages, thereby increasing the rate of production and at the same time providing a device wherein the sides of the mandrel form almost a continuous surface, so that the rate of withdrawal for the reinforcing elements is substantially constant.

In the event it is found desirable to feed a plurality of reinforcing elements in groups as shown in Figure 14, a plurality of supply packages 107 may be substituted instead of the supply packages 77. The reinforcing elements advance from the supply packages 107 through an eye member 108, and if necessary through a suitable source of adhesive material to cause the elements to adhere as a group to the sheet material. These reinforcing elements are subsequently spread by spreader roller 104, as shown in Figure 15, in order to spread the elements side by side as shown at 12a in Figure 14.

Although only three supply packages and only three reinforcing elements have been shown, the number of supply packages and the number of elements in each group is a matter of choice. In actual practice the number of elements would probably be greatly increased to obtain the desired characteristics. Each element is preferably of a very small diameter and thus the ultimate thickness of the reinforcing elements 12a is not objectionable. For example, a reinforcing element is suitably a yarn of from 50 to 100 denier or so; in short if tiny twisted yarns are used in sufficient number in a bundle wide thin bands can be produced which make for excellent reinforcement.

The apparatus for reinforcing paper disclosed herein lends itself to a multiplicity of uses. It may be utilized when applying reinforcing paper strips in spaced relation from each other. The distance between the reinforcing strips may be controlled in several ways; one way to alter the distance between the reinforcing strips is to change the number of supply rolls; another way is to change the speed or rate of rotation of the gear rings 3 and 76. A third way to change the spacing of the strips is to change the rate of speed at which the paper webs 2 are fed over the mandrel. Either one of these methods will change the relative spacing; and instead of using only one method, a combination of two or more methods may be utilized.

Furthermore the apparatus lends itself to the application of two or more types of reinforcing elements. The apparatus may be utilized for producing reinforced paper, reinforced with paper strips, with textile reinforcing elements, with yarn, or any desirable combination thereof.

In making this transversely reinforced paper the adhesive may be applied in any suitable manner. Instead of using a spray, the adhesive may be applied by a roll applicator, by capillary attraction, as for example a wick, by immersion, or by conveying the adhesive by a tube to one surface of the reinforcing material. There may be an adhesive tank for each yarn, for a few yarns, or for all the yarns, as referred to hereinafter. Where more than one adhesive tank is utilized the tanks must rotate in unison with the yarn supply packages to permit wetting the yarns with adhesive prior to being applied transversely to the sheets of paper. In the event the adhesive is already applied to the reinforcing strips when withdrawn from the supply packages, the adhesive may be activated by water, by a chemical solvent, by heat, or a pressure sensitive adhesive may be used.

In Figure 16 mandrels consisting of flat platen-like members 109 and 110 over which the paper 2 is fed through the reinforcing station have been used instead of the mandrel shown in Figure 1. These mandrels or platen-like members are flat from side to side and are provided with slots having mounted therein rollers 111 cooperating with rollers 112 to flatten the substantially round, adhesively moistened, reinforcing elements 113 into flattened reinforcing elements 114. The rollers 111 and 112 may be driven to aid in feeding the paper over the mandrels or platens. By this arrangement it is possible to spread the filaments of the reinforcing elements out into wide thin bands while the filaments are adhesively moistened.

The rollers 112 coming into contact with the reinforcing bands or elements are preferably coated with "Teflon" or some other suitable material having substantially no affinity for the adhesive material used in securing the reinforcing elements to the paper or backing sheets. The platen-like members need not necessarily be parallel to each other, in that if three are used they form a triangle, or if four are used they form a square. The number of platen-like members used determines the configuration of the assembly. Further, flat platen-like members 109 and 110, not having slots, may be used to back up the sheets and small rollers or the equivalent thereof (see 104 in Figure 15) may be rotated around the longitudinal axis of the platens with these small rollers being moved across the width of the sheet parallel to the lay of the yarns and substantially perpendicular to the advance of the sheets of paper.

By applying a sufficient quantity of adhesive to the reinforcing elements before the reinforcing elements reach the paper, then as the reinforcing elements are applied to the paper applying a pressure directly to the adhesively moistened elements and prior to the setting of the adhesive, it is possible to squeeze surplus adhesive from the elements and spread this surplus adhesive over the surface between the elements, in order to provide a coating or laminating adhesive adapted to secure a second web of paper to said coating of laminating adhesive before the adhesive sets; this followed by the curing of the adhesive to bond the two sheets of paper to the reinforcing elements sandwiched between the two sheets of paper by the adhesive material to produce a laminated structure.

The adhesive used may be of a type and having the properties of quickly saturating the interstices between the filaments of the textile material so as to be carried by the textile material of the yarn in substantial quantity between the filaments and on their surfaces. This adhesive material has the property of lubricating a group of substantially untwisted textile members applied on a sheet of material in a manner to assist a pressure instrument to spread the group of substantially untwisted members to a width many times the thickness of the original group of filaments. This adhesive material should preferably be non-tacky to the surface of the pressure instrument, and at the same time should have an adhesive affinity for the paper, in order to adhesively hold the filaments to the paper when spread out and pressed thereagainst. When the adhesive has set, the filaments are then permanently adhered to the paper sheet.

The adhesive may be applied to the reinforcing elements 12 as illustrated in Figure 17 wherein the elements 12 are shown being passed into a porous vessel 115 immersed in a tank 116 of adhesive material. The elements 12 pass under the roller 117 in their passage through the porous vessel 115. Such equipment may be substituted for the spray booth described in connection with Figure 11.

Figure 18 illustrates a product formed with the apparatus of the present invention. As shown in the figure the backing 2 is provided with a plurality of bands 66 which at 118 are shown to be spread into contact to provide a substantially uniform surface over the backing.

It will be understood that this invention is susceptible to modification in order to adapt it to different usages and conditions and accordingly, it is desired to comprehend such modifications within this invention as may fall within the scope of the appended claims.

I claim:

1. The combination, in apparatus for producing transversely reinforced sheet material, of a mandrel adapted to have sheet material fed longitudinally thereover, support means rotatable about the longitudinal axis of the mandrel, said support means having thereon means for mounting a source of reinforcing elements, other means for guiding the reinforcing elements to the mandrel, means for applying adhesive to the reinforcing elements for bonding them to the sheet material, a second support means embracing the mandrel and a carriage movable along the same, pressure applicator means supported from said carriage for engaging and squeezing the filaments as they reach the sheet material and means for driving the carriage along said second support means.

2. The combination, in apparatus for producing transversely reinforced sheet material, of a mandrel adapted to have sheet material fed longitudinally thereover, a first support rotatable about the longitudinal axis of the mandrel, a source of reinforcing elements carried on the first support and rotatable therewith, a second support between the mandrel and first support and also rotatable about the longitudinal axis of the mandrel, guide means on each of the first and second supports for the guiding of the reinforcing elements from the first support to the mandrel, and force-applicator means between the second support and the mandrel positioned to apply a spreading force to the reinforcing elements in the advance thereof to the mandrel.

3. The combination, in apparatus for producing transversely reinforced sheet material, of a mandrel adapted to have sheet material fed longitudinally thereover, first, second and third supports each rotatable about the axis of the mandrel, the first support having a source of reinforcing elements thereon, guide means so arranged on each of the supports that the reinforcing elements pass from the source on the first support, outwardly to the guide means of the third support, then inwardly toward the mandrel to the guide means on the first support and then to the guide means on the second support and to the mandrel, and force-applicator means positioned between the mandrel and second support adapted to apply a spreading force to the reinforcing elements in the advance thereof to the mandrel.

4. In an apparatus for applying reinforcing elements adhesively secured to webs of sheet material, the combination including a mandrel adapted to have sheet material fed thereover, means for applying adhesively treated reinforcing elements to the webs of sheet material as the webs of sheet material are advanced over the mandrel, and pressure means for spreading the reinforcing elements after they are applied to the webs of sheet material but before the adhesive is set, said last mentioned means including a track surrounding the mandrel, a carriage mounted for travel on the track, an instrument mounted on the carriage for direct engagement with the reinforcing elements to spread the same, and means for propelling the carriage along the track so as to cause the carriage to travel around the mandrel.

5. A device for producing reinforcing sheet material wherein reinforcing strips are adhesively secured transversely across the width of sheet material, said device including a centrally disposed mandrel over which the sheet material to be reinforced is fed, a ring gear surrounding the mandrel, means for driving the ring gear so as to cause the ring gear to rotate around the mandrel, means for mounting a plurality of supply packages for reinforcing strip material for rotation with the ring gear, and a plurality of guide means for guiding the strip material from the supply packages to the mandrel, one of the guide means including a track surrounding the ring gear, a chain driven through the track, a second track mounted between the ring gear and the mandrel, the contour of the second track being similar in contour to the outer surface of the mandrel, a second chain driven in synchronism with the ring gear and mounted in the second track, the two tracks being so designed that the distance from the supply packages to the first guide means plus the distance to the second guide means plus the distance to the mandrel remains substantially constant throughout the entire rotational path of the ring gear and the chains being driven in synchronism with the ring gear so as to cause the strip material to be withdrawn from said supply packages at a substantially uniform rate of speed.

6. A device for producing reinforced sheet material wherein reinforcing strips are adhesively secured transversely across the width of sheet material, said device including a mandrel over which the sheet material to be reinforced is fed, rotatably mounted means surrounding the mandrel, means for driving said rotatably mounted means, means supporting on said rotatably mounted means a plurality of supply packages of reinforcing strip material so as to rotate therewith, a first and a second guide means for guiding the strip material from the supply packages to the mandrel, the first guide means including a guide member surrounding the rotatably mounted means and forming a closed path, a strip guide, means for supporting and driving the strip guide along said guide member, the second guide means including a guide member mounted in close proximity to the mandrel and forming a closed path surrounding the mandrel, a strip guide device mounted upon the guide member of said second guide means for supplying the reinforcing strips to the sheet material fed over the mandrel, and means mounted between said first and second guide means for applying adhesive to the reinforcing strips after the strips leave the supply packages and before the strips contact the sheet material.

7. A device according to claim 6 wherein the guide device of said second guide means includes a pivotally mounted member provided with means for urging the same resiliently towards the adjacent mandrel member.

8. A device according to claim 6 wherein the guide device of the second guide means includes a pivotally mounted arm, and an applicator attached to the pivotally mounted arm for exerting a pressure against the reinforcing strip so as to press it against the sheet material as it is fed over the mandrel.

9. A device for producing reinforced sheet material wherein reinforcing material is adhesively secured transversely across the width of a sheet of paper, said device including a centrally disposed mandrel over which the paper to be reinforced is fed, a ring gear surrounding the mandrel, the main body of the ring gear lying in a plane substantially normal to the plane in which the paper is fed, said ring gear having a plurality of groups of supply packages mounted thereon, each supply package containing reinforcing material consisting of substantially continuous length twisted members, a plurality of guide means for guiding the reinforcing members from the supply packages to the point of contact with the paper on the mandrel, there being one guide means for each group of supply packages so that each guide means guides a plurality of reinforcing members, each said plurality of members being applied to said sheet as a group to constitute one reinforcing element, means for applying adhesive to the reinforcing members between the supply packages and the point of contact of the members with the paper, and pressure means for spreading the reinforcing elements out to a width upon the paper substantially greater than its thickness after the reinforcing elements have been applied thereto but before the adhesive material has set.

10. A device as in claim 6 in which the mandrel is one having more than two facets, each of which is adapted to have a web of paper fed thereover.

11. A device for producing reinforced sheet material wherein reinforcing elements are adhesively securely transversely across the width of sheets of material, said device including a centrally disposed non-circular mandrel over which the sheets are fed, rotatable support means disposed for rotation around the mandrel, said rotatably mounted means supporting a plurality of supply packages of reinforcing elements, guide mechanism for guiding the elements from the supply packages to the sheets of material, said mechanism comprising guide means surrounding the rotatable support means and forming a closed path, each supply package having a guide eye located on said closed loop guide means, a second closed loop guide means disposed within said rotatable support means and surrounding said mandrel, means for driving the guide eyes of both said closed loop guide means in synchronism with the motion of said rotatable support means, means for supporting and driving said reinforcing element guide eyes along said closed loop guide means in synchronism with the motion of the rotatable support means, the shape of said closed loop guide means being such that the distance between a supply package and its guide eye on said first closed loop guide means plus the sum of the distances from said guide eye to the guide eye on said second closed loop guide means and from the latter to the point of tangency of the element with the sheet material remains substantially constant during a complete revolution, means for rotating said supply packages to unwind the reinforcing material, and means for applying the elements to the sheet material substantially without turns of twist in them.

12. A device for producing reinforced sheet material wherein reinforcing elements are adhesively secured transversely across the width of sheets of material, said device including a centrally disposed non-circular mandrel over which the sheets are fed, rotatably mounted means, said rotatably mounted means supporting a plurality of supply packages of reinforcing elements, a pair of guide means for guiding the elements from the supply packages to the mandrel, one of the guide means including a guide member surrounding the rotatably mounted means and forming a closed path, outboard guide eyes for the reinforcing elements, means for supporting the outboard guide eyes along said guide member, the other guide means including a second guide member forming a closed path close to and surrounding the mandrel, inboard guide eyes, means for supporting and driving said second guide eyes along said second guide member, there being one guide eye on each of the guide members for each reinforcing element, the shape of the guide members being such that the distance between a supply package and its outboard guide eye plus the distance to the inboard guide eye plus the distance to the point of tangency with the mandrel remains substantially constant during a complete revolution, means for unwinding the reinforcing elements by rotating the supply packages, and means for applying the elements to the sheet material in substantially untwisted form.

13. In apparatus for coating sheet material with adhesive and for simultaneously reinforcing the sheet material, a mandrel over which the sheet material is adapted to be passed, means for applying adhesively treated reinforcing elements transversely to said sheet material, said means including a support rotatable about the longitudinal axis of the mandrel, said support having thereon means for applying adhesive material to the reinforcing elements in their passage to the mandrel, a second support embracing the mandrel, and filament pressure applicator means supported from said second support and movable along the same for pressing the filaments against said sheet material to spread the same, to squeezze adhesive from the filaments and to spread such squeezed adhesive laterally of the filaments.

References Cited in the file of this patent
UNITED STATES PATENTS

| | | |
|---|---|---|
| 2,610,936 | Carlson | Sept. 16, 1952 |
| 2,719,804 | Carlson | Oct. 4, 1955 |
| 2,725,323 | Chadwick et al. | Nov. 29, 1955 |